(12) United States Patent
McKinney et al.

(10) Patent No.: US 11,108,937 B2
(45) Date of Patent: Aug. 31, 2021

(54) PIVOTAL GANGWAY HAVING CONTAINER SPOTTING SYSTEM

(71) Applicant: Safe Rack LLC, Andrews, SC (US)

(72) Inventors: Jason Ronald McKinney, Murrells Inlet, SC (US); Jeff W. Reichert, Pawleys Island, SC (US)

(73) Assignee: Safe Rack LLC, Andrews, SC (US)

( * ) Notice: Subject to any disclaimer, the term of this patent is extended or adjusted under 35 U.S.C. 154(b) by 0 days.

(21) Appl. No.: 16/577,599

(22) Filed: Sep. 20, 2019

(65) Prior Publication Data

US 2020/0014826 A1    Jan. 9, 2020

Related U.S. Application Data

(63) Continuation of application No. 15/843,576, filed on Dec. 15, 2017, now Pat. No. 10,469,716.

(60) Provisional application No. 62/435,308, filed on Dec. 16, 2016.

(51) Int. Cl.
| | |
|---|---|
| *H04N 5/225* | (2006.01) |
| *B63B 27/14* | (2006.01) |
| *E01D 15/02* | (2006.01) |
| *E01D 18/00* | (2006.01) |
| *E01D 19/10* | (2006.01) |
| *H04N 5/232* | (2006.01) |

(52) U.S. Cl.
CPC .......... *H04N 5/2253* (2013.01); *B63B 27/14* (2013.01); *E01D 18/00* (2013.01); *E01D 19/103* (2013.01); *H04N 5/2257* (2013.01); *H04N 5/23293* (2013.01); *H04N 5/232939* (2018.08); *E01D 15/02* (2013.01)

(58) Field of Classification Search
CPC .......... H04N 5/2253; H04N 5/232939; H04N 5/2257; H04N 5/23293; B63B 27/14; E01D 19/103; E01D 18/00; E01D 15/02
See application file for complete search history.

(56) References Cited

U.S. PATENT DOCUMENTS

| | | | |
|---|---|---|---|
| 7,950,095 B2 | 5/2011 | Honeycutt et al. | |
| 10,087,641 B2 | 10/2018 | Harmon | |
| 2006/0024046 A1* | 2/2006 | Jones | G08B 13/19632 396/427 |
| 2006/0054392 A1* | 3/2006 | MacDonald | B66F 11/04 182/113 |
| 2008/0079837 A1* | 4/2008 | Masubuchi | G02B 7/34 348/345 |
| 2008/0180526 A1 | 7/2008 | Trevino | |

(Continued)

*Primary Examiner* — Abdelaaziz Tissire
(74) *Attorney, Agent, or Firm* — Nelson Mullins Riley & Scarborough LLP

(57) ABSTRACT

An apparatus comprising a gangway having a proximal end and a distal end. A cage assembly is connected to the distal end of the gangway. The apparatus further comprises a container spotting system including a camera mounted such that its field of view will show a hatch cover of a container when the hatch cover is in a predetermined location. Video electronics are in electrical communication with the camera. The container spotting system further includes a display device in electrical communication with the video electronics, the display device being operative to show at least a selected portion of the field of view of the camera. The camera may comprise an outdoor dome camera mounted to an underside of the gangway.

8 Claims, 4 Drawing Sheets

(56) References Cited

U.S. PATENT DOCUMENTS

| | | | |
|---|---|---|---|
| 2010/0147528 A1* | 6/2010 | Baugh | E21B 19/004 |
| | | | 166/355 |
| 2010/0171889 A1 | 7/2010 | Pantel et al. | |
| 2012/0006619 A1 | 1/2012 | DuBose et al. | |
| 2012/0199711 A1* | 8/2012 | Tsai | F16M 13/022 |
| | | | 248/220.22 |
| 2013/0312872 A1 | 11/2013 | Tobbe et al. | |
| 2018/0371768 A1 | 12/2018 | Harmon | |

\* cited by examiner

PIVOTAL GANGWAY HAVING CONTAINER SPOTTING SYSTEM

PRIORITY CLAIM

This application is a continuation of application Ser. No. 15/843,576, filed Dec. 15, 2017, which is based upon and claims priority to provisional application Ser. No. 62/435,308, filed Dec. 16, 2016. Both of the aforementioned applications are incorporated fully herein by reference for all purposes.

FIELD OF THE INVENTION

The present invention relates to fall restraint equipment, and more particularly, to a pivotal gangway having a container spotting system.

BACKGROUND OF THE INVENTION

Fall restraint equipment may include platforms, ramps, bridges, steps, guardrails, gangways, cages, and other structures. Gangways, for instance, may be used to provide access to an area, such as the top of a storage container. For example, a semitrailer truck or a railroad carriage transporting loadable material may need to be loaded or unloaded from the container's top. A gangway is used to provide workers a path to an access hatch on top of the container. The access hatch is generally pivoted on an axis either parallel or transverse to the longitudinal axis of the container.

A cage may be located at the distal end of the gangway to surround the area on top of the container where the worker will be standing. The gangway, and thus the cage, are stowed (i.e., retracted) as the container is moved into position so that they do not interfere with movement of the container. After the container is in the desired position, the gangway is lowered until the cage is adjacent to the top of the container. If the container is positioned correctly, the access hatch will then be at approximately the center of the cage.

As will be appreciated, however, the containers come in various lengths and different hatch positions. Thus, positioning some part of the container (e.g., the front side) at a certain location relative to the gangway will not necessarily ensure that the hatch is in the correct location. If the hatch is slightly forward or rearward of the gangway, the container will need to be moved accordingly. Multiple iterations may be required in order to position the hatch correctly, thus leading to operator frustration and loss of productivity.

SUMMARY OF THE INVENTION

The present invention recognizes and addresses the foregoing considerations, and others, of prior art construction and methods.

One aspect of the present invention provides an apparatus comprising a gangway having a proximal end and a distal end. A cage assembly is connected to the distal end of the gangway. The apparatus further comprises a container spotting system including a camera mounted such that its field of view will show a hatch cover of a container when the hatch cover is in a predetermined location. Video electronics are in electrical communication with the camera. The container spotting system further includes a display device in electrical communication with the video electronics, the display device being operative to show at least a selected portion of the field of view of the camera.

According to some embodiments, the camera, which may comprise an outdoor dome camera, is mounted to an underside of the gangway. The display device may comprise a flat screen display mounted at an elevated location, such as at the upper end of a column. It may often be desirable to house the display device in a weather-resistant enclosure. In addition, target indicia may be provided on a screen of the display device. For example, target indicia may be formed as an "X."

Another aspect of the present invention provides an apparatus comprising a gangway having a proximal end and a distal end. A container spotting system is also provided, including a camera mounted to an underside of the gangway and oriented such that its field of view will show when the hatch cover is in a predetermined location. Video electronics are in electrical communication with the camera. A display device is in electrical communication with the video electronics, the display device being operative to show at least a selected portion of the field of view of the camera.

A still further aspect of the present invention provides an apparatus comprising a cage assembly having a rail structure defining an enclosed area in which a worker can stand. A support structure to which the cage assembly is connected via a mechanism that raises and lowers the cage assembly is also provided. This aspect includes a container spotting system having a camera oriented such that its field of view will show when the container is in a predetermined location. Video electronics in electrical communication with the camera are also provided. A display device is in electrical communication with the video electronics, the display device operative to show at least a selected portion of the field of view of the camera.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1A:
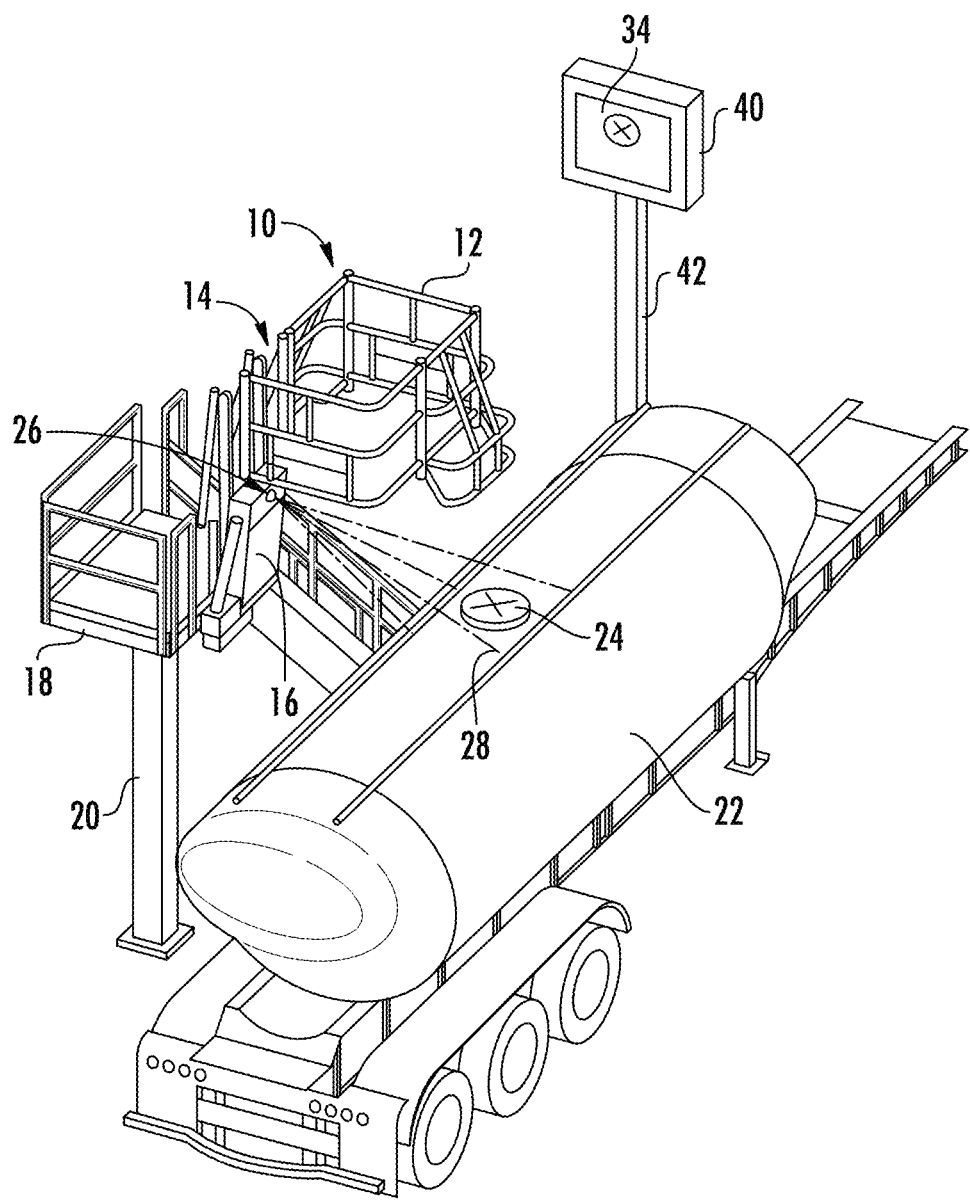
FIGS. 1A and 1B show a gangway assembly having a container spotting system in accordance with the present invention, in stowed and working positions relative to a container.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1B:
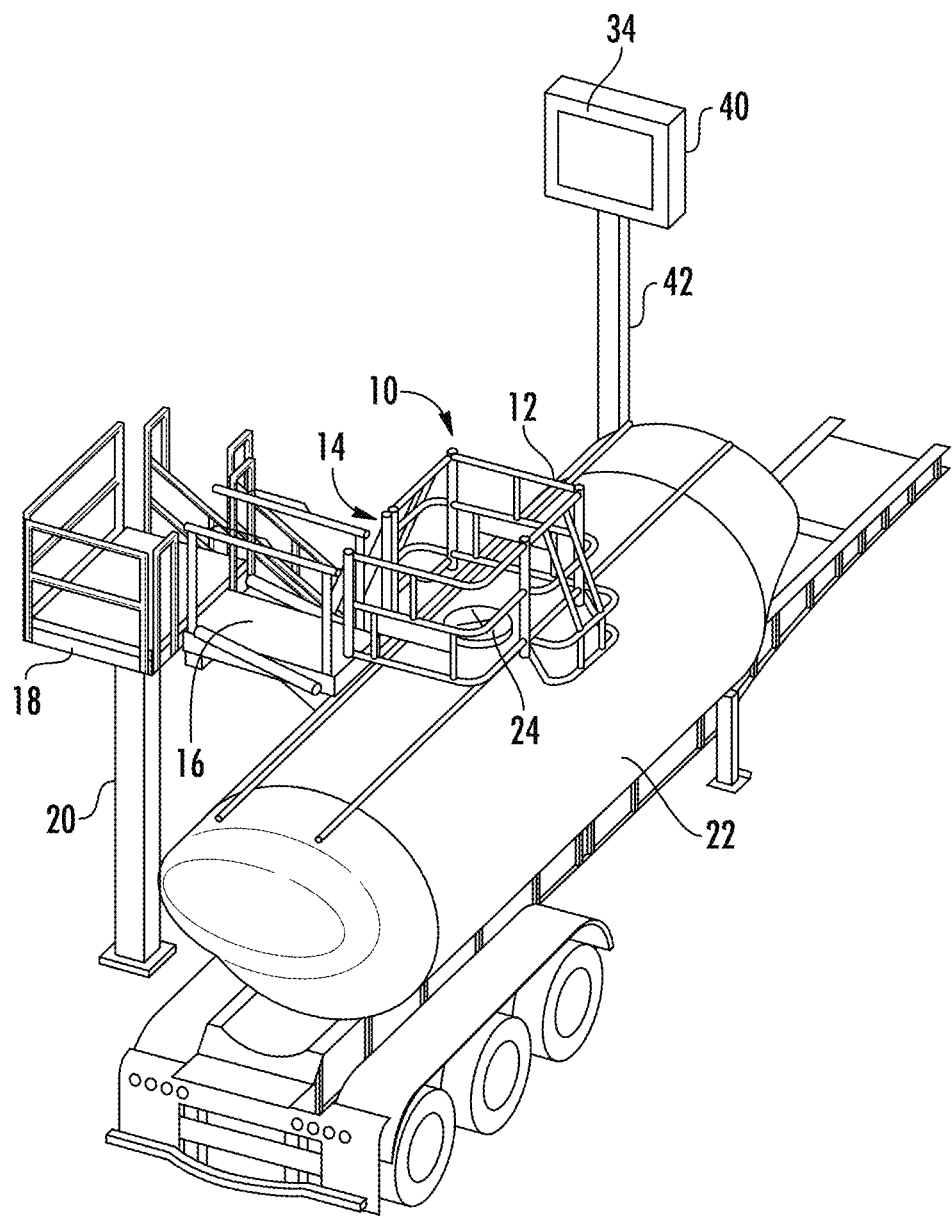

Referring now to FIGS. 1A and 1B, a cage assembly 10 (i.e., "cage") includes a rail structure 12 defining an enclosed area, generally rectangular in shape, within which a worker can stand when cage assembly 10 is lowered into the working position. Rail structure 12 defines an opening 14 through which the worker would access the enclosed area. As shown, cage assembly 10 is connected to the distal end of a pivotal gangway 16. The proximal end of gangway 16 is pivotally connected in this case to a fixed platform 18 located at the appropriate height. Platform 18 is appropriately supported, such as by one or more support column(s) 20. Examples of suitable gangways that may be used with embodiments of the present invention are shown and described in U.S. Pat. No. 7,950,095, incorporated fully herein by reference for all purposes. Exemplary cage assemblies that may be used with embodiments of the present invention are shown and described in copending U.S. application Ser. No. 15/285,722, filed Oct. 5, 2016 (published on Apr. 13, 2017 as U.S. Pub. No. 2017/0101791), incorporated fully herein by reference for all purposes.

In FIG. 1A, gangway 16 is shown in its stowed (i.e., raised) position. As a result, cage assembly 10 will be located above the expected maximum height of a container (e.g., container 22) with which it might be used. In the exemplary situation shown, the container 22 is part of a semitrailer moved into position by a common tractor truck. The container includes an access hatch on its top surface, accessible via a pivotal hatch cover 24. When the container 22 is in the correct axial location, gangway 16 is lowered to the working position shown in FIG. 1B. Ideally, hatch cover 24 will then be in the center of cage assembly 12 so as to be accessible by a worker.

As noted above, however, it is often difficult to position container 22 correctly. In the past, it was not uncommon to discover that the container had been incorrectly positioned only after the cage and gangway had been lowered. This would require moving the cage and gangway back into the stowed position, adjusting the axial position of the container, and again lowering the cage and gangway. If the position of the container is still not correct, the process will need to be repeated again.

Figure 2:
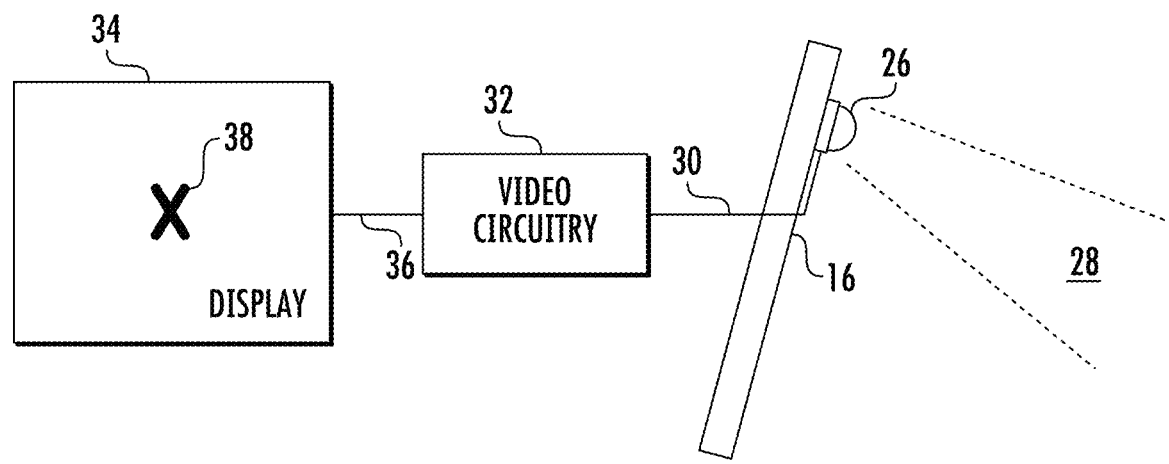
FIG. 2 is a diagrammatic representation of the container spotting system shown in FIGS. 1A and 1B.
Figure 3:
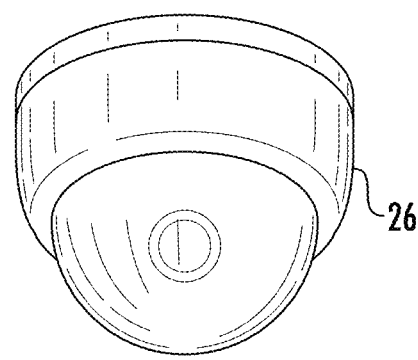
FIG. 3 is a perspective view of an exemplary camera that may be used with the container spotting system shown in FIGS. 1A and 1B.

Referring now also to FIG. 2, the present invention provides a container spotting system to overcome this concern. In this embodiment, the container spotting system utilizes at least one camera 26 mounted to the underside of gangway 16. The camera is oriented such that, when gangway 16 is raised, its field of view (FOV) 28 will encompass the region in which the hatch cover 24 is located when container 22 is in the correct axial position. In some preferred embodiments, the camera may comprise an outdoor dome camera, such as the one shown in FIG. 3, that senses light in the visible spectrum. As one skilled in the art will appreciate, these cameras typically mount so as to depend from a ceiling or the like. These cameras, generally used in surveillance and security applications, are inexpensive and widely available. They may be battery powered, or powered by an external power source. In addition, they may communicate with other aspects of the system by wired or wireless connection (e.g., wifi or Bluetooth®).

In this regard, camera 26 is in electrical communication (such as via wired communication link 30) with suitable video circuitry 32. Because gangway 16 moves between stowed and working positions, one skilled in the art will appreciate that wired communication link 30 should be of appropriate length and appropriately routed so as not to interfere with gangway movement. One skilled in the art will appreciate that video circuitry 32 will generally include an appropriate hardware processor and associated memory executing video processing instructions. In this regard, circuitry 32 receives the signal from camera 26 and provides a suitable video output to display device 34 (such as via wired communication link 36). While video circuitry 32 is shown as a separate device in FIG. 2, one skilled in the art will appreciate that video circuitry 32 can be incorporated into camera 26 or display device 34, as necessary or desired. Display device 34 will preferably comprise a relatively large flat screen monitor suitable for use in an outdoor environment. For example, display device 34 may comprise an LED monitor in the 55-inch class or larger. In this regard, communication link 36 may comprise any suitable video link, such as VGA, DVI, S-video, component video, or HDMI.

For reasons to be explained, display device 34 may preferably have a target 38 on its face that is used in the spotting process. In this embodiment, for example, target 38 may be in the form of a large "X" on the video screen. While the "X" may be generated electronically by video circuitry 32 when the spotting system is in use, some preferred embodiments contemplate a permanent marking (such as via paint) applied to the surface of the display screen or a transparent environmental cover adjacent to the display screen.

Referring to FIGS. 1A and 1B, display device 34 is preferably mounted in a location (such as an elevated location) that can be easily seen by the driver of the tractor truck. In the illustrated embodiment, for example, display device 34 is contained in a suitable (e.g., a weather-resistant) enclosure 40 mounted at the upper end of a support column (pole) 42. The driver looks at the screen of display device 34 as the container 22 is moved alongside gangway 16 to determine when the hatch cover 24 is in the correct position. (Hatch cover 24 is shown in this case also having target indicia which can align with target 38 when hatch cover 24 is in the correct position. Oftentimes, however, such target indicia may not be deemed necessary since the driver can simply align the image of hatch cover 24 with target 38.)

Figure 4A:
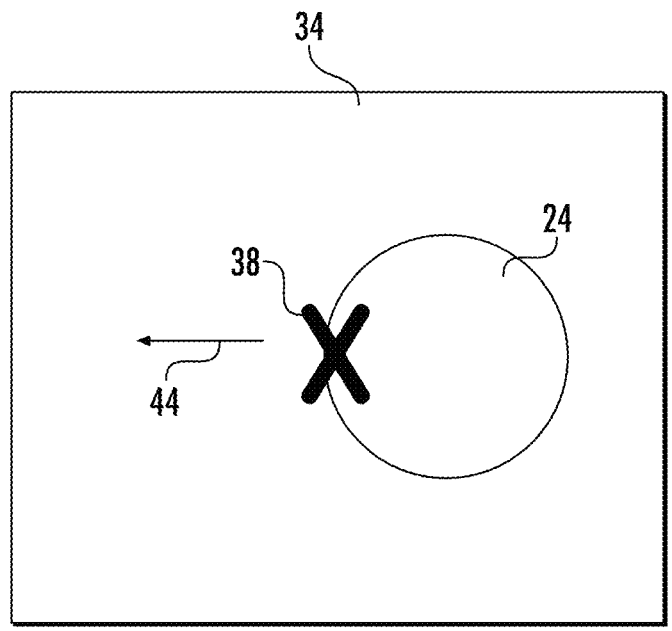
FIGS. 4A and 4B show the display device of the container spotting system of FIGS. 1A and 1B as the hatch is coming toward the desired spotting location.
Figure 4B:
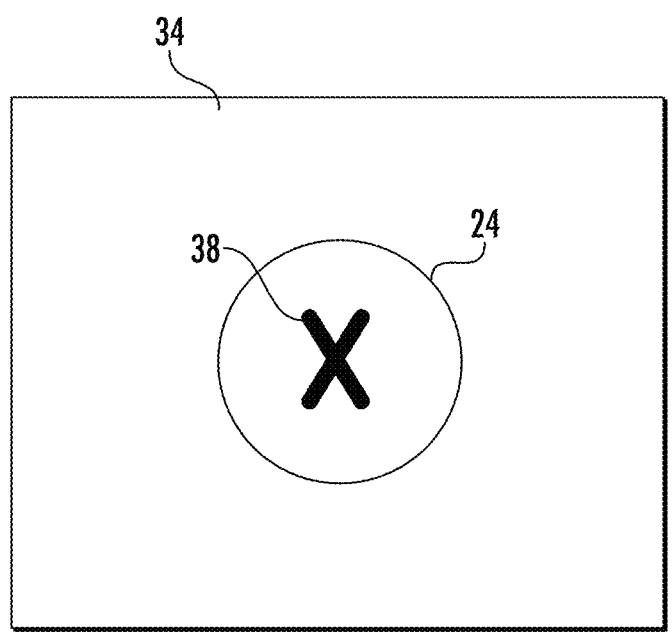

This alignment can be described most easily with reference to FIGS. 4A and 4B. In this regard, FIG. 4A shows container 22 moving into position adjacent gangway 16 (as indicated by arrow 44). As can be seen, hatch cover 24 is approaching alignment but is not yet aligned with target 38. In FIG. 4B, hatch cover 24 is properly aligned with target 38. At this point, further movement of container 22 is stopped and cage assembly 12 can be moved into the working position.

While the exemplary case shown aligns the target 38 with a hatch cover, principles of the invention may also be used with containers that do not have hatch covers. In this case, target 38 may be aligned with some other part of the container where placement of the cage is desired.

It can thus be seen that the present invention provides a gangway having a novel container spotting system. While one or more preferred embodiments of the invention have been described above, it should be understood that any and all realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A method of moving a container having a top hatch cover into position to be loaded or unloaded, said method comprising steps of:
   (a) positioning the container alongside a structure supporting an elevated gangway which is pivotal between a stowed position and a working position, the gangway having a cage assembly at its distal end defining an enclosed area;
   (b) while moving the container, viewing a display device showing a field of view corresponding to at least a portion of the enclosed area of the cage assembly when the gangway is in the working position; and
   (c) stopping movement of the container when the top hatch cover is in a selected location within the enclosed area of the cage assembly, wherein the display device has target indicia thereon and step (c) involves aligning the top hatch cover with the target indicia.

2. The method as set forth in claim 1, further comprising the step of:
   (d) lowering the gangway into the working position after the top hatch cover is in the selected location.

3. The method as set forth in claim 2, further comprising the step of:
   (e) opening the top hatch cover of the container.

4. The method as set forth in claim 1, wherein the display device is a flat screen display mounted at an elevated location.

5. The method as set forth in claim 4, wherein the flat screen display is mounted at the upper end of a column.

6. The method as set forth in claim 4, wherein the target indicia is formed as an "X".

7. The method as set forth in claim 1, wherein the field of view shown on the display device is supplied via a camera mounted to an underside of the gangway.

8. The method as set forth in claim 7, wherein said camera comprises an outdoor dome camera.

* * * * *